(12) United States Patent
Gil

(10) Patent No.: US 7,191,259 B2
(45) Date of Patent: Mar. 13, 2007

(54) METHOD AND APPARATUS FOR FAST INTEGER WITHIN-RANGE COMPARE

(75) Inventor: Mercedes E Gil, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1002 days.

(21) Appl. No.: 10/119,889

(22) Filed: Apr. 10, 2002

(65) Prior Publication Data

US 2003/0193942 A1    Oct. 16, 2003

(51) Int. Cl.
G06F 13/00 (2006.01)
G06F 3/00 (2006.01)
H04L 1/00 (2006.01)
G01R 31/00 (2006.01)
G06F 15/16 (2006.01)

(52) U.S. Cl. ............... 710/33; 710/29; 710/32; 710/34; 709/228; 370/230

(58) Field of Classification Search .......... 710/29, 710/32, 33, 34; 709/228, 238; 370/230, 370/235
See application file for complete search history.

(56) References Cited

U.S. PATENT DOCUMENTS 5,999,531 A * 12/1999 Ferolito et al. ............ 370/390
6,266,706 B1 * 7/2001 Brodnik et al. ............ 709/242
6,529,478 B1 * 3/2003 Schwartz et al. .......... 370/236
6,529,508 B1 * 3/2003 Li et al. .................... 370/392
6,999,462 B1 * 2/2006 Acharya .................... 370/401
2002/0101919 A1 * 8/2002 Takada et al. ............. 375/225
2003/0026268 A1 * 2/2003 Navas ........................ 370/400
2003/0188015 A1 * 10/2003 Lee et al. ................... 709/238

* cited by examiner

*Primary Examiner*—Kim Huynh
*Assistant Examiner*—Scott Sun

(57) ABSTRACT

A fast with-in range comparator is implemented in digital logic. A packet arrives at a device for processing. Initial packet data that is available in a first read cycle, is used to compute data that is necessary for later cycles. The initial data and the subsequently data are then used to test a single value against a range of values. In a method of the present invention a range is separated into two ranges. An upper limit of the first range is tested to determine whether the value is below the upper limit. If this test fails, the value is tested to determine whether the value is between the upper limit of the first range and the upper limit of the full range. The ranges are tested by constructing a bit vector. Data representing the capability of a communicating port, is then used to index into the bit vector. The outcome of the index is a value that signifies whether the port can support the packet or not.

11 Claims, 5 Drawing Sheets

METHOD AND APPARATUS FOR FAST INTEGER WITHIN-RANGE COMPARE

BACKGROUND OF THE INVENTION

1. Field of the Invention

This invention relates to packet processing. Specifically, the present invention relates to packet testing and validation.

2. Description of the Related Art

Communications networks have grown and developed over the past several years. Modern data communications networks are complaint with several communications protocols. The communications protocols set standards and provide specifications for compliance. For example, in a packet network a communication protocol would define the structure of packets (e.g. packet format) implementing the protocol and determine how the packets are communicated across a network.

In addition, the protocols define methods for routing and processing the packets. Since packets often include their source and destination address, communications protocols define how these addresses are formatted and how the addresses are used to forward the packets. However, although a protocol may define that a specific field may be used to format or process packets, these protocols don't often define how these processes should be implemented. This is often a task for the designer or manufacturer.

Therefore, it is common for communications protocols to define the format of a packet, but not define the process for testing or processing the packet. For example, packets communicated across a network have fields that often need to be compared with a range of fields. However, communications protocols don't often define exactly how these values should be compared or when during the packet processing that the value should be compared.

Packet lengths are often defined in a packet and often have to be compared with a range of values. For example, a port in a device may support a range of packet sizes. As a result, when a packet arrives at a port, the specific packet size encoded in the packet has to be compared with the range of packet sizes accepted by the port. The method for performing this comparison is not often defined by a communication protocol. However, single value to multiple value range comparison, is typically performed a number of times as a packet is processed through a network.

In addition, the method used to perform functions that are not defined by communications protocols, such as single value to multiple value range comparisons, may make a substantial difference in the performance of a system. Therefore, this specific aspect of packet processing has received some attention by designers.

A few conventional methods have been developed for performing range comparisons. In some implementations, the single value is compared with every value in the range. If the range is 16 values long, this would mean 16 comparisons. However, the speed of performing this type of comparison every time a comparison has to be made, on every packet, is slow. A second method would involve storing the upper limit of the range in a memory at every port and performing a simple test on the single value. However, this does not work when the range values are not incremental, in addition it requires additional memory to store the upper limit range value. Lastly, it is slow to implement in digital logic.

There is a need for an efficient method of making a single value to multiple value range comparison. There is a need for a method of implementing a range comparison that is fast compared with conventional methods. Lastly, there is a need for implementing a range comparison that uses simple digital logic.

SUMMARY OF THE INVENTION

A method and apparatus for performing a fast within range comparison of a first value with a second range of values is presented. An incoming packet is received in a processing device. The incoming packet includes information related to the length of the packet and information related to the virtual lane designated for the packet. Two six bit vectors are constructed. The first six bit vector is a packet length bit vector. The second six bit vector is a virtual lane bit vector. Packet length related and virtual lane related port information is retrieved from a table. The packet length port information is used to index a value in the packet length bit vector. The virtual lane port information is used to index a value in the virtual lane bit vector. The output of the indexing is an indication of whether a port can support a specific packet length or virtual lane.

A system is presented which comprises an encoder that constructs a bit vector in response to packet information. The bit vector including bit positions. A memory storing port information is presented. Indexing logic is coupled to the encoder and coupled to the memory. The indexing logic generates an output signal by using the port information to index into a bit position in the bit vector.

A method of operating a system is presented comprising the steps of receiving a first value associated with a packet. A first range of values is constructed in response to the first value associated with the packet. A second range of values is stored. A second value is synthesized from the second range of values. An output signal is generated by using the second single value to index into the first range of values.

DESCRIPTION OF THE INVENTION

Figure 1:
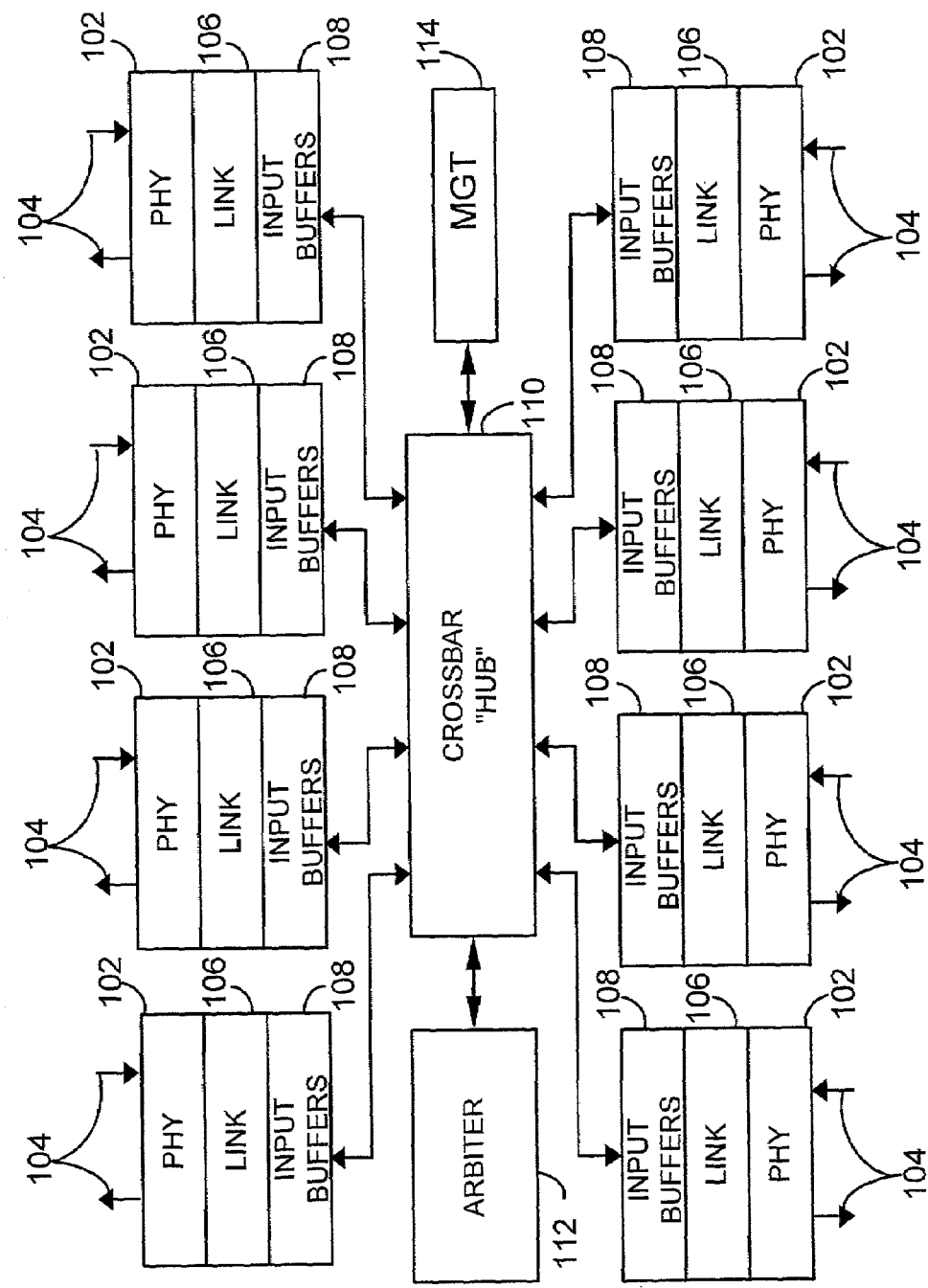
FIG. 1 is a block diagram of a switch implementing the method and apparatus of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The method and apparatus of the present invention is discussed within the context of an Infiniband (e.g. Infiniband Release 1.0, 2000 by Infiniband Trade Association) Architecture. Specifically, one embodiment of the present invention is implemented in a switch. However, it should be appreciated that the present invention may be implemented with respect to other standards compliant technologies and may be implemented in a variety of communications technologies such as switches, routers, channel adapters, repeaters and links that interconnect switches, routers, repeaters and channel adapters.

The Infiniband protocol stack works within the context of the Open System Interconnection (OSI) model, which is promulgated by the International Standards Organization (ISO). The OSI model defines a physical layer, a link layer, a network layer, a transport layer and upper level protocol layers. The Infiniband specification defines a media access control layer and a link-encoding layer that performs the link layer functionality of the OSI model. The Infiniband specification defines a network layer that performs the network layer functionality of the OSI model. Lastly, the Infiniband Architecture defines an Infiniband Architecture (IBA) Operations Layer which performs the transport layer functionality of the OSI model.

A switch compliant with the Infiniband Architecture implements the media access control functions and link encoding functionality of the Infiniband Architecture, with media access control functions and packet relay functions. Routers compliant with the Infiniband Architecture implement the media access control and the link encoding functionality of the Infiniband Architecture with a combination of media access control functions and link layer functions. Lastly, routers implement network layer functionality, with a packet relay implementation.

Infiniband compliant communications are organized as transactions between end-users. The transactions are fragmented into message units and the message units are fragmented into data packets. The data packets are the end-to-end routable unit of transfer within the Infiniband Architecture. Packets communicated within a network (e.g. subnet routing), use the media access control and link encoding functionality of the Infiniband Architecture. Packets transmitted between networks (e.g. inter-subnet routing), use the network layer functionality of the Infiniband architecture.

In the Infiniband Architecture packets are communicated in virtual lanes. A virtual lane is a communication path (e.g. communications link) shared by packets from several different end-nodes, end-users or transactions. In the present embodiment of the invention, eight virtual lanes are defined, however, the Infiniband Architecture provides for 15 virtual lanes. It should be appreciated that the method and apparatus of the present invention may be applied irrespective of the number of virtual lanes. Separate buffering and flow control is provided for each virtual lane and an arbiter is used to control virtual lane usage and manage the flow of packets across virtual lanes.

An Infiniband compliant data packet includes, in data order, a local route header for subnet routing, a global route header for inter-subnet routing, a base transport header, an extended transport header, an immediate data header, a message payload, an invariant cyclical redundancy check and a variant cyclical redundancy check. Each of these data groupings has a pre-defined length. As noted from the ordering of the information, the local route header is the first portion of the packet to enter a processing device.

The local route header (LRH) includes the information for local routing within an Infiniband Architecture. The LRH is eight bytes long and resides at the start of every packet. The local route header includes, in data order, a virtual lane field (VL), a link version field (Lver), a service level field (SL), a first reserve field, a link next header field (LNH), a destination local identifier (DLID), a second reserve field, a packet length field (PLEN) and a source local identifier (SLID).

The virtual lane field is four bits long. The virtual lane field identifies the virtual lane that the packet will be communicated on and identifies which receive buffer should receive the packet. The link version field is four bits long. The Link version field specifies the version of the local route header that the packet is using. The service level field is four bits long. The service level field is used by switches to determine the virtual lane to transmit the packet on. The first reserve field is two bits long, the first reserve field is presented in the local route header for future use. The link next header field is two bits long and specifies which headers follow the local route header.

Source and destination local identifiers are present in the local route header (LRH). A local identifier (LID) is an address assigned to a port by a subnet manager. The local identifier (LID) field is unique within the subnet and is used for directing packets within the subnet. The destination local identifier (DLID) follows the Link Next header field and is 16 bits long. The destination local identifier (DLID) specifies a destination port. In addition, the DLID identifies the route the packet should take to the destination port. If the packet will be routed to another subnet (e.g. through a router), the destination local identifier is the local identifier of the router. A second reserve field of five bits is also included in an Infiniband compliant packet. The second reserve field is provided for future use. The packet length (PLEN) field is 11 bits long. The packet length field represents the number of four-bytes words included in a packet. In an Inifinband compliant packet, the value of the packet length field is equal to the number of bytes in all fields starting from the first byte of the local route header and ending with the last byte before the CRC check, divided by four. The source local identifier (SLID) field is 16 bits long. The source local identifier (SLID) is the port that communicated the packet onto the subnet.

FIG. 1 is a block level diagram of a switch implementing the method and apparatus of the present invention. In FIG. 1 a physical layer block 102 is shown. The physical layer block 102 provides physical layer management such as media interface (e.g. twisted pair cable, fiber optics) and signaling. For example, in the present embodiment, each physical layer block 102, has 1× or 4× (e.g. Infiniband specification provides for 1×, 4×, 12×) capacity as shown by 104. As a result, four pairs of twisted pair wires (e.g. 4×) are used for incoming traffic and four pairs of twisted pair wires (e.g. 4×) are used for outgoing traffic. In the 4× implementation, data is striped across all four incoming and outgoing twisted pairs, increasing the bandwidth by a factor of four over a 1× implementation (e.g. where incoming and outgoing data would communicate across 1 pair of twisted pair wires).

The physical layer block 102 interfaces with a link layer block 106. The link layer block implements the media access control and link encoding functionality of the Infiniband specification. The link layer block interfaces with input buffers 108. After packets enter the switch and are processed through the physical layer 102 and the link layer 106, the packets are then buffered in the input buffers 108. The input buffers 108 connect to a crossbar switch 110 which switches incoming and outgoing traffic buffered in the input buffers 108. The Arbiter 112 manages the crossbar switch 110. In addition, a management block 114 is shown. The management block 114 performs Infiniband designated management functions and vendor specific functionality such as Built In Self Test (BIST).

Figure 2:
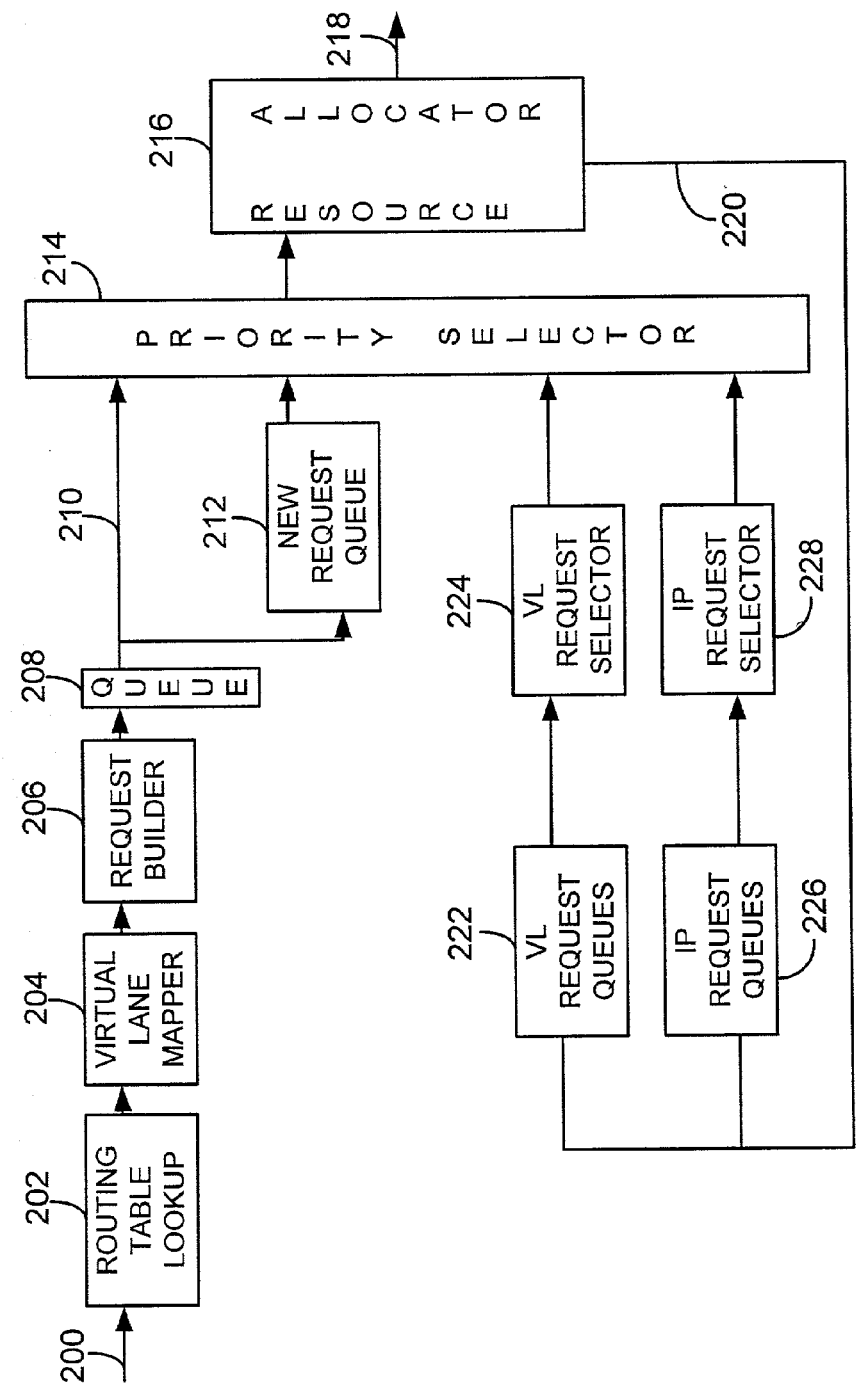
FIG. 2 is a block diagram of an Arbiter implementing the method and apparatus of the present invention.

FIG. 2 displays a block diagram of the Arbiter 112, shown in FIG. 1. The Arbiter grants and denies request to use the crossbar switch. The request come in from packets stored in the input buffers located on each port. An initial request 200 comes into the Arbiter. The initial requests 200 includes information such as destination local identifier (DLID), service level (SL) and Packet Length (PLEN). The request 200 is input into a routing table lookup 202, which determines an output port (OP) based on the DLID. The IP, SL and OP from the routing table lookup 202 are input into the virtual lane mapper 204. The virtual lane mapper 204 maps packets to virtual lanes based on the IP, SL and OP. The virtual lane mapper 204 also inputs into a request builder 206.

The method and apparatus of the present invention are primarily implemented in the request builder 206. The request builder 206 builds a packet initiated request for the switch. The request are collected and queued at block 208 and then input directly (e.g. direct request as shown by 210) into a priority selector 214 or in the alternative, the request are queued in a new request queue 212. The priority selector 214 serves as an input to the resource allocator 216. The priority selector 214 selects a request based on priority. The resource allocator 216 allocates resources in the switch. A request grant is shown as 218. Request are moved into and out of a virtual lane request queue 222 and an input port request queue 226, through a feedback loop 220. Virtual lane request are selected from virtual lane queue 222, by the virtual lane request selector 224. Input port request are selected from the input port queue 226, by the input port request selector 228. Ultimately, the priority selector 214, selects request from the direct request 210, the new request queue 212, the virtual lane request selector 224 and the input port request selector 228. The priority selector 214 then inputs into the resource allocator 216 and resources are allocated.

Figure 3:
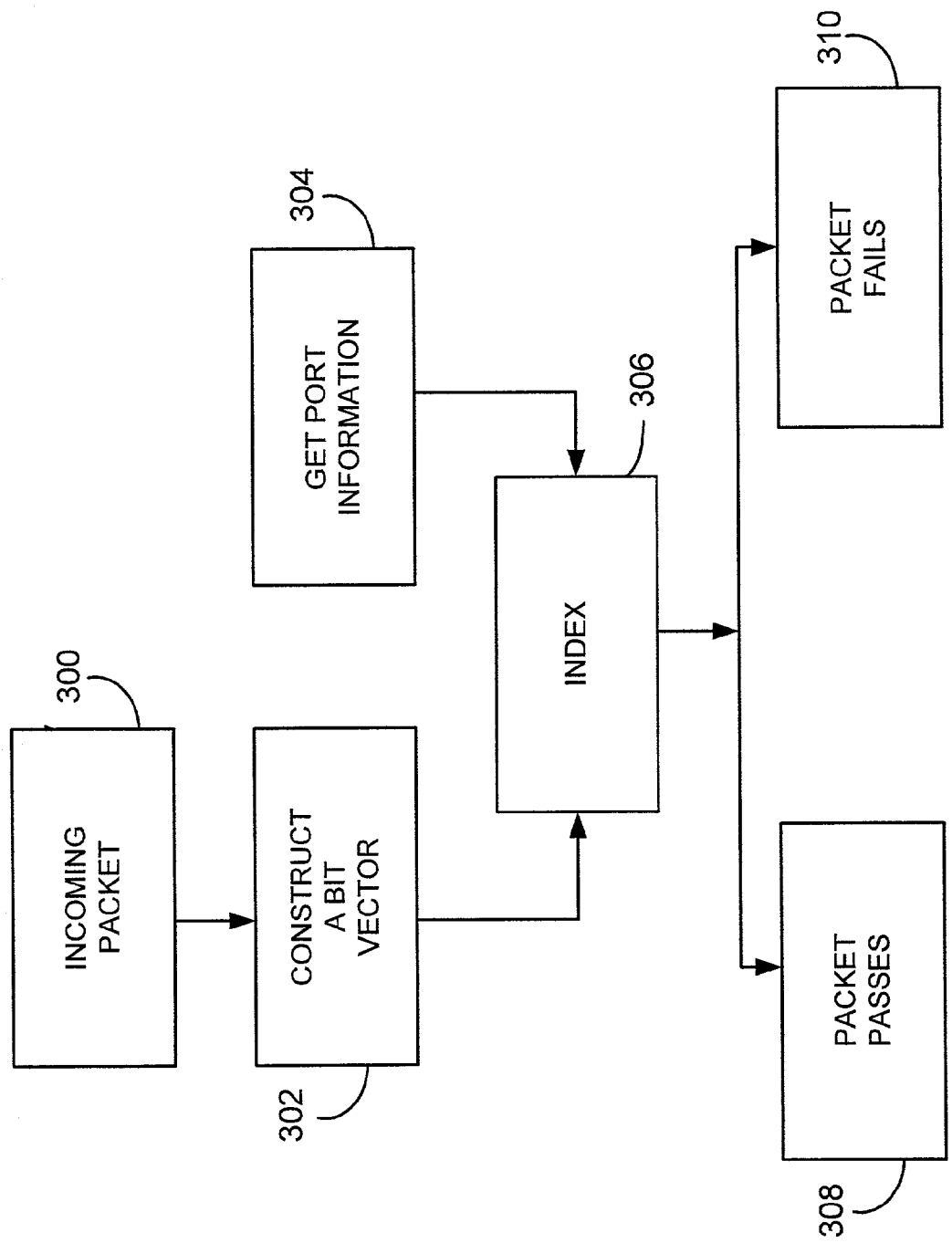
FIG. 3 is a flow diagram of the method of the present invention.

FIG. 3 displays a flow diagram of a method implemented in the present invention. The method presented in association with FIG. 3 is applicable for testing a single value against a range of values during packet processing. In the present embodiment, the method is applied to determine whether a port can support a packet based on the packets length or virtual lane designation. However, it should be appreciated that the method may be applied in other context (e.g. against other fields in a packet) and using different protocols.

In FIG. 3 a packet comes into a port during the first half of a read cycle and is stored in an input buffer as shown at 300. The packet length field and the virtual lane field are assessed to construct a bit vector. A bit vector (e.g. one for packet length and one for virtual lanes) is constructed as shown by 302, using a methodology presented below. A table storing packet length capacity (maximum MTU) for a specific port and the virtual lanes supported by the port, is accessed to determine the maximum MTU and the virtual lanes supported by the port. Values representing the maximum MTU and the allowable virtual lanes are accessed from the table, as shown at 304. The values representing the maximum MTU and the virtual lane are used as an index into the bit vector as shown by 304. The bit location is an indication of whether the port can support the packet or not. A value of 1 as shown at 308, refers to the packet passing (e.g. port supports the packet length, the virtual lane). A value of 0, as shown at 310, refers to the packet failing (e.g. port does not support the packet length, virtual lane).

The method associated with FIG. 3, results in a fast method of performing single value to multiple value comparisons. Since the single value designation (e.g. packet length) is available early in the packet processing cycle, the single value is used to develop a range of values (e.g. a packet length bit vector). The range of values (e.g. maximum MTU for a port) acceptable by a port is then synthesized into a single value (e.g. "value" included in the Maximum MTU table, Table II given below) and used to index into bit positions in the packet length bit vector. A detailed description of this process is provided below.

The methodology described in FIG. 3 is shown with respect to two examples. The first example, is an implementation of the method applied to the packet length. The second example, is an implementation of the method applied to the virtual lane.

The method of FIG. 3 may be implemented to test the packet length. An incoming packet is received as shown at 300 and the packet length field is analyzed. A packet length bit-vector is constructed using the packet length field from the incoming packet as shown at 302. A maximum MTU size (e.g. maximum packet size that a port can support) is retrieved from a memory (e.g. latch array) storing the maximum MTU size per port as shown by 304. Table I given below, details the maximum MTU size for a port compliant with the Infiniband specification. A value representing the maximum MTU size is then used as an index into the packet length bit vector as shown at 306. Based on the bit value selected by the value representing the maximum MTU size, a packet either passes as shown at 308 or fails as shown at 310.

The maximum packet size of an Infiniband compliant packet is given in Table 1.

TABLE I

Packet Size (Maximum MTU)

| MTU | Maximum Packet Length (Bytes/4):(Hex) | Maximum Bytes (MTU + 126) |
|---|---|---|
| 256 | 95:(5F) | 382 |
| 512 | 159:(9F) | 638 |
| 1024 | 287:(11F) | 1150 |
| 2048 | 543:(21F) | 2174 |
| 4096 | 1055:(41F) | 4222 |

A maximum MTU is the maximum packet size that a port is configured to communicate. The maximum MTU size for a given port is stored in a table. In the method of the present invention, a value representing the maximum MTU size is read from the table, in accordance with 304 of FIG. 3.

The Maximum MTU Value table (e.g. Table II) given below, displays a table including the values for a maximum MTU size. Table II represents the table associated with each port, as mentioned above (e.g. item 304 of FIG. 3). As shown by Table II given below, a maximum MTU of 256 bytes would be represented by 0x0 hexadecimal. A maximum MTU of 512 would be represented by 0x2. A maximum MTU of 1024 would be represented by 0x3. A maximum MTU of 2048 would be represented by 0x4. Lastly, a maximum MTU of 4096 would be represented with a value of 0x5. The hexadecimal values are used to index into the packet length bit vector.

TABLE II

Maximum MTU Value

| Value | Binary | Meaning |
|---|---|---|
| 0x0 | 000 | Reserved |
| 0x1 | 001 | 256 bytes |
| 0x2 | 010 | 512 bytes |
| 0x3 | 011 | 1024 bytes |
| 0x4 | 100 | 2048 bytes |
| 0x5 | 101 | 4096 bytes |
| 6–15 Reserved | | |

In the method of the present invention, a 6-bit packet length vector is constructed as shown by 302 of FIG. 3. The 6-bit packet length vector is tested to determine whether a packet (e.g. based on the packet length field) is larger than the maximum MTU size for a port. The Packet Length Bit Vector table (e.g. Table III) given below, displays the packet length bit vector for 256, 512, 1024, 2048 and 4096 maximum MTU's.

TABLE III

| Maximum MTU | Packet Length Bit Vector | | | | | |
|---|---|---|---|---|---|---|
| | Bit position | | | | | |
| | 5 | 4 | 3 | 2 | 1 | 0 |
| 256 | 1 | 1 | 1 | 1 | 1 | 0 |
| 512 | 1 | 1 | 1 | 1 | 0 | 0 |
| 1024 | 1 | 1 | 1 | 0 | 0 | 0 |
| 2048 | 1 | 1 | 0 | 0 | 0 | 0 |
| 4096 | 1 | 0 | 0 | 0 | 0 | 0 |

The 6-bit packet length vectors shown in Table III are constructed as follows, if the packet has a data length of 256 bytes or less, bit positions 1 through 5 of the packet length bit vector are set to one; indicating that a maximum MTU value of 0x1, 0x2, 0x3, 0x4 or 0x5 (e.g. see Table II), is required for the packet to be valid. If the packet length has a data length of 512 bytes or less, bit positions 2 through 5 of the packet length bit vector are set to one, indicating that a maximum MTU value of 0x2, 0x3, 0x4 or 0x5 is required for the packet to be valid. If the packet has a data length of 1024 bytes or less, bit positions 3 through 5 of the packet length bit vector are set to one, indicating that a maximum MTU value of 0x3, 0x4 or 0x5 is required for the packet to be valid.

If the packet has a data length of 2048 bytes or less, bit positions 4 through 5 of the packet length bit vector is set to one, indicating that a maximum MTU value of 0x4 or 0x5 is required for the packet to be valid. If the packet length results in a data length of 4096 bytes or less, bit position 5 of the packet length bit vector is set to one, indicating that a maximum MTU value of 0x5 is required for the packet length to be valid.

An example of the methodology used for generating the packet length bit-vector is provided below. In one embodiment of the present invention a port with a maximum MTU size of 256 bytes may be used. An Infiniband compliant port with a maximum MTU size of 256 bytes would be able to transmit a packet with a maximum of 382 bytes long or a packet length field of 95 quadlets, where a quadlet is 4 bytes long (e.g. 0x5F hexadecimal) as shown in Table I. Assuming in our example, that the incoming packet is 382 bytes. Using a 382 byte long packet a bit-vector is constructed, as discussed with respect to 302 of FIG. 3. A 382 byte long packet is represented as 1011111 in binary. Since the Infiniband packet length field is eleven bits long, the packet would be formatted as follows in Table IV:

TABLE IV

Infiniband compliant Packet

| Bit-position: | 10 | 9 | 8 | 7 | 6 | 5 | 4 | 2 | 1 | 0 |
|---|---|---|---|---|---|---|---|---|---|---|
| Bit-value: | 0 | 0 | 0 | 1 | 0 | 1 | 1 | 1 | 1 | 1 |

In Table IV bit-position 0 is the least significant bit and bit-position 10 is the most significant bit.

Since 382 bytes—95 quadlets—0x5F hexadecimal is not an easy computational power of two, an easy computational power of two is selected to analyze the packet length. As a result, the analysis will segment into two steps. First a test is performed to determine if the packet is less than the easy computational power of two. Then a test is performed to determine if the packet is between the easy computational power of two and 95 quadlets (e.g. 0x5F), which is the maximum number of quadlets acceptable by a port with an MTU of 256 bytes. The two step analysis will result in a 0 bit value or a 1 bit value which will be placed in the 256 byte bit position (e.g. bit position 1, of Table III) in the packet length bit vector. The process is then be repeated for 512, 1024, 2048 and 4096. As a result, the bit positions for each of these maximum MTU values (e.g. bit position 2, 3, 4, 5 of Table III) will be filled with a 0 bit value or a 1 bit value.

In the present embodiment, 64 decimal or 0x40 hexadecimal is chosen as an easy computational power of two, because of the ease of implementation in binary logic. Therefore, the first test is performed to determine if the packet size is below 0x40. The second test is then performed to determine if the packet size is between 0x40 and 0x5F, the maximum packet size of a port with a maximum MTU of 256 (e.g. see Table I).

In the first step of our analysis, we look at the five most significant bits (e.g. bit-positions 10 to 6 of Table IV) and XNOR the five most significant bits (e.g. from Table IV, 00010) with the value 00000. The XNOR logical operator makes a comparison of two numbers. When two bits are the same the XNOR value is true (e.g. 1). When two bits are different the XNOR value is false (e.g. 0). As a result, if a 1 appears in any one of the five most significant positions, performing a logical XNOR operation on the five bit positions, with 00000 will produce a 0 value. Comparing bit positions 10 to 6 with 00000, serves as a fast test to determine if the packet size is less than 0x40 hexadecimal or 64 bytes decimal (e.g. the easy computational power of two).

The XNOR computation for bit-positions 10 to 6 is given in Table V.:

TABLE V

First XNOR computation

| | | | | | |
|---|---|---|---|---|---|
| (Bit positions 10 to 6 see Table IV) | 0 | 0 | 0 | 0 | 1 |
| (256 packet size limit) | 0 | 0 | 0 | 0 | 0 |
| Result 1: | 1 | 1 | 1 | 1 | 0 |

A logical "AND" is then performed on Result 1, to determine if a zero value occurred in Result 1. A zero value would mean that there is a value of 1 in bit positions 10 through 6. For example, the following logical operation is performed: 1+1+1+1+0=0. From the logical "AND," outcome one is computed, which is 0. The resulting 0 (e.g. outcome one), signifies that the packet size is greater than 0x40 hexadecimal since at least one of the bits in the XNOR computation resulted in a zero. If all the bits in the XNOR computation were 1, the logical "AND" computation would have produced a 1, which would signify that the packet length is less than 0x40 hexadecimal. After determining that the value of the packet length is greater than 0x40 hexadecimal, we then test whether the packet length is between 0x40 hexadecimal and 0x5F hexadecimal (e.g. the value of the maximum packet size for a 256 maximum MTU port).

An alternative approach for performing the first step of the method of the present invention is to NOR the five most significant bits together. If the bitwise NOR results in a 1, then all the bits are zero. If the bitwise NOR results in a zero, then one or more bits are 1.

The second test determines if the packet length is between 0x40, the easy computations power of two and 0x5F, the maximum MTU size for a 256 byte packet. To determine whether the packet is between 0x40 hexadecimal and 0x5F hexadecimal, bit positions 10 through 5 are tested. To perform the second step of the analysis we first observe the bit pattern of the numbers between 0x40 and 0x5F. An example of the bit pattern is given below in Table VI.

TABLE VI

Range Table

| HEX | Binary (76543210) | HEX | Binary (76543210) |
|---|---|---|---|
| 40 | 01000000 | 50 | 01010000 |
| 41 | 01000001 | 51 | 01010001 |
| 42 | 01000010 | 52 | 01010010 |
| 43 | 01000011 | 53 | 01010011 |
| 44 | 01000100 | 54 | 01010100 |
| 45 | 01000101 | 55 | 01010101 |
| 46 | 01000110 | 56 | 01010110 |
| 47 | 01000111 | 57 | 01010111 |
| 48 | 01001000 | 58 | 01011000 |
| 49 | 01001001 | 59 | 01011001 |
| 4a | 01001010 | 5a | 01011010 |
| 4b | 01001011 | 5b | 01011011 |
| 4c | 01001100 | 5c | 01011100 |
| 4d | 01001101 | 5d | 01011101 |
| 4e | 01001110 | 5e | 01011110 |
| 4f | 01001111 | 5f | 01011111 |

Analyzing the pattern presented by the range in Table VI, bits in positions 7 to 5 do not change. However, bits in positions 0 through 4 do change. Therefore, any packet between the values of 0x40 and 0x5F would have the bit pattern 010 in the most significant bit positions. Therefore we take the value 010 and add three additional zero values to build a six bit value for testing. Adding an additional three bits results in the bit pattern 010000. When this bit pattern is turned around to match the most significant bits of the incoming packet, a bit pattern of 000010 results. XNORing bits 10 through 6 of the incoming packet with bit pattern 000010, results in the following computation.

TABLE VII

Second XNOR computation

| (Bit positions 10 to 6) | 0 | 0 | 0 | 1 | 0 |
| (256 packet size limit) | 0 | 0 | 0 | 1 | 0 |
| Result 2: | 1 | 1 | 1 | 1 | 1 |

A logical "AND" is then performed on Result 2. The following logical operation is performed: 1+1+1+1+1=1. From the logical "AND" outcome 2 is computed which is a one.

A logical OR operation is then performed on the first outcome (e.g. outcome 1) and the second outcome (e.g. outcome 2), to determine if the packet is below 0x40 or between 0x40 and 0x5F. As such, if the packet is less than 0x40 hexadecimal bytes long or the packet is between 0x40 hexadecimal and 5F hexadecimal, the OR would result in a true combined outcome (e.g. 1). In our example, the combined outcome computation, is given below as Table VIII.

TABLE VIII

Combined Outcome computation

| (Outcome one: packet position 10 through 6) | 0 |
| (Outcome two: packet positions 10 through 6) | 1 |
| (Combined outcome) | 1 |

The packet length bit-vector is then constructed with the combined outcome serving as the first input for the bit vector. The Bit vector is constructed with the most significant bits as the left most bit position and the least significant bits as the right most bit position. The zero position in the bit vector is reserved. The 1st bit position corresponds to a packet length that is less than 256 maximum MTU size. The 2nd bit position corresponds to a packet length that is less than 512 maximum MTU size. The 3rd bit position corresponds to a packet length that is less than 1028 maximum MTU size. The 4th bit position corresponds to a packet length that is less than 2048 maximum MTU size. The 5th bit position corresponds to a packet length that is less than 4096 maximum MTU size. Therefore, in the current example, the bit in the one position would be set which corresponds to a maximum MTU size of 256. At this stage of the process, the packet length bit vector would look as follows in Table VIII given below:

TABLE IX

Packet Length bit vector (e.g. 256 bit set)

| Bit position | 5 | 4 | 3 | 2 | 1 | 0 |
| Bit vector value | 0 | 0 | 0 | 0 | 1 | 0 |

The process is repeated for a 512 maximum MTU size, a 1024 maximum MTU size, a 2048 maximum MTU size and a 4096 maximum MTU size. Should the incoming packet be less than these respective lengths, a bit position corresponding to each maximum MTU size would be set. Therefore, when a packet is less than 256, bit positions 1, 2, 3, 4 and 5 are set. When a packet is less than 512, bit positions 2,3, 4 and 5 are set. When the packet is less than 1024, bit positions 3,4, and 5 are set. When the packet is less than 2048 bit positions 4 and 5 are set. Lastly, when the packet is less than 4096, bit position 5 is set.

The two step method presented above is applied to the 512, 1024, 2048 and 4096 values using the ranges presented in Table X given below:

TABLE X

Test Ranges & Bit Patterns

| Maximum MTU | (1) First step value (2) Second step value | Bit Pattern Value |
|---|---|---|
| 256 | (1) Less than 0x40 (2) Between 0x40 & 0x5F | 000010 |
| 512 | (1) Less than 0x80 (2) Between 0x80 & 0x9F | 000100 |
| 1024 | (1) Less than 0x100 (2) Between 0x100 & 0x11F | 001000 |
| 2048 | (1) Less than 0x200 (2) Between 0x200 & 0x21F | 010000 |
| 4096 | (1) Less than 0x400 (2) Between 0x400 & 0x41F | 100000 |

Once the packet length bit vector has been constructed as shown at 302 in FIG. 3 data representing the Maximum MTU size (e.g. see Table II) of the port, is read from a table maintained in a memory associated with the port (e.g. 304 of FIG. 3).

As shown in the maximum MTU Table II, a maximum MTU size associated with 256 will test bit 1 from the packet length bit vector. A maximum MTU size associated with 512 will test bit 2 in the packet length bit vector. A maximum MTU size associated with 1024 will test bit 3 in the packet length bit vector. A maximum MTU size associated with 2048 will test bit 4 in the packet length bit vector. Lastly, a maximum MTU size associated with 4096 will test bit 5 in the packet length bit vector. Once the appropriate bit is tested (e.g. item 306 of FIG. 3), a packet pass signal 308 is generated or a packet fail signal 310 is generated. It should be appreciated that in the method of the present invention, the testing of the respecting bits in the packet length bit vector is done by indexing into the specific bit position in the packet length bit vector.

The final packet length bit vector, shown in Table III includes the following characteristics. Bit 0 is always 0. If bit 0 is set, it would indicate that the packet is reserved or has a currently undefined value.

Bit 1 is set if the packet length satisfies a maximum MTU of 256, which is 382 bytes including headers or 95 quadlets=0x5F hex, the maximum value of the packet-length field. To determine bit 1, a first test of the packet length field is performed to determine if the packet length field is less than 0x40. The first test is performed by checking that bits positions 10 to 6 are 0, meaning the packet length is less than 0x40. The first test generates a first result on which a logical "AND" operation is performed to produce outcome one. In a second test, bit positions 10 to 5 are compared to a bit pattern 000010, to determine if the packet length field is between 0x40 or 0x5F. The second test produces a second result, on which a logical "AND" operation is performed to produce outcome two. Outcome one is then compared with outcome two to produce a combined outcome, which is the value placed in the 256 byte position of the packet length bit vector.

Bit 2 is set if the packet length satisfies a maximum MTU of 512, which is 638 bytes including headers or 159 quadlets=0x9F hex, the maximum value of the packet length field. To determine bit 2, a first test of the packet length field is performed to determine if the packet length field is less than 0x80. The first test is performed by checking that bits positions 10 to 7 are 0, meaning the packet length is less than 0x80. The first test generates a first result on which a logical "AND" operation is performed to produce outcome one. In a second test, bit positions 10 to 5 are compared to a bit pattern 000100, to determine if the packet length field is between 0x80 or 0x9F. The second test produces a second result, on which a logical "AND" operation is performed to produce outcome two. Outcome one is then compared with outcome two to produce a combined outcome, which is the value placed in the 512 byte position of the packet length bit vector.

Bit 3 is set if the packet length satisfies a maximum MTU of 1024, which is 1150 bytes including headers, which is 287 quadlets=0x11F hex, the maximum value of the packet length field. This bit is set if the packet length satisfies a maximum MTU of 512, which is 1150 bytes including headers or 287 quadlets=0x11F hex, the maximum value of the packet length field. To determine bit 2, a first test of the packet length field is performed to determine if the packet length field is less than 0x100. The first test is performed by checking that bits positions 10 to 8 are 0, meaning the packet length is less than 0x100. The first test generates a first result on which a logical "AND" operation is performed to produce outcome one. In a second test, bit positions 10 to 5 are compared to a bit pattern 001000, to determine if the packet length field is between 0x100 or 0x11F. The second test produces a second result, on which a logical "AND" function is performed to produce a outcome two. Outcome one is then compared with outcome two to produce a combined outcome, which is the value placed in the 1024 byte position of the packet length bit vector.

Bit 4 is set if the packet length satisfies a maximum MTU of 2048, which is 2174 bytes including headers, which is 543 quadlets=0x21F hex, the maximum value of the packet length field. This bit is set if the packet length satisfies a maximum MTU of 2048, which is 2174 bytes including headers or 543 quadlets=0x21F hex, the maximum value of the packet length field. To determine bit 4, a first test of the packet length field is performed to determine if the packet length field is less than 0x200. The first test is performed by checking that bits positions 10 to 9 are 0, meaning the packet length is less than 0x200. The first test generates a first result on which a logical "AND" operation is performed to produce outcome one. In a second test, bit positions 10 to 5 are compared to a bit pattern 010000, to determine if the packet length field is between 0x200 or 0x21F. The second test produces a second result, on which a logical "AND" function is performed to produce a outcome two. Outcome one is then compared with outcome two to produce a combined outcome, which is the value placed in the 2048 byte position of the packet length bit vector.

Bit 5 is set if the packet length satisfies a maximum MTU of 4096, which is 4222 bytes including headers, which is 1055 quadlets=0x41F hex, the maximum value of the packet length field. This bit is set if the packet length satisfies a maximum MTU of 4096, which is 4222 bytes including headers or 1055 quadlets=0x41F hex, the maximum value of the packet length field. To determine bit 5, a first test of the packet length field is performed to determine if the packet length field is less than 0x400. The first test is performed by checking that bits position 10 is 0, meaning the packet length is less than 0x400. The first test generates a first result on which a logical "AND" operation is performed to produce outcome one. In a second test, bit position 10 to 5 compared to a bit pattern 100000, to determine if the packet length field is between 0x400 or 0x41F. The second test produces a second result, on which a logical "AND" operation is performed to produce outcome two. Outcome one is then compared with the outcome two to produce a combined outcome, which is the value placed in the 4096 byte position of the packet length bit vector.

As shown by the foregoing method, a single value of the packet length is available in the early clock cycles of a packets processing. As a result, the single value is used to create a packet length bit vector using the foregoing method. In other words, several testable values (e.g. the packet length bit vector) are constructed from the initial value (e.g. the packet length field). The range of packet lengths supported by a port, which are available later in the packet processing cycle, are then synthesized into a single value for testing (e.g. see Table II). The maximum MTU value supported by a port (e.g. the single synthesized value) is then used to index into the range of testable values (e.g. the packet length vector).

The method associated with FIG. 3, also results in a fast method of performing single value to multiple value comparisons for virtual lanes. Since the single value designation (e.g. virtual lane) is available early in the packet processing cycle, the single value is used to develop a range of values (e.g. a virtual lane bit vector). The range of virtual lanes supported by a port is then synthesized into a single value (e.g. "bit position value," included in the Virtual Lane Port Table XII, given below) and used to index into bit positions in the virtual lane bit vector. A detailed description of this process is provided below.

The method associated with FIG. 3 may be implemented to test the virtual lanes that a port will support. An incoming packet is received as shown at 300 and the virtual lane field is analyzed. A virtual lane bit-vector is constructed using the virtual lane field from the incoming packet as shown by 302. A value representing a single virtual lane or a range of virtual lanes, is retrieved from a table storing the virtual lanes supported by a port as shown by 304. The value representing the range of virtual lanes or the single virtual lane is then used as an index into the virtual lane bit vector as shown by 306. Based on the bit value selected by the value representing the range of virtual lanes, a packet either passes as shown by 308 or fails as shown by 310.

In FIG. 3, a packet comes into a port as shown by item 300. The packet includes information designating a virtual lane that the packet will use. A Infiniband compliant packet includes four bits designating a virtual lane. The bit field corresponding to the virtual lanes is shown in Table XI given below:

TABLE XI

Virtual Lane Field of an Infiniband Compliant Packet

| Virtual Lane | Bit Field | Virtual Lane | Bit Field |
|---|---|---|---|
| VL0 | 0000 | VL8 | 1000 |
| VL1 | 0001 | VL9 | 1001 |
| VL2 | 0010 | VL10 | 1010 |
| VL3 | 0011 | VL11 | 1011 |
| VL4 | 0100 | VL12 | 1100 |
| VL5 | 0101 | VL13 | 1101 |
| VL6 | 0110 | VL14 | 1110 |
| VL7 | 0111 | VL15 | 1111 |

For example, an incoming packet designated for communication on a virtual lane (VL)=2 has a bit field of 0010.

Logical operators are used once again to construct the virtual lane bit vector. In the present embodiment, a "NOR" logical operator is used, however, it should be appreciated that various logical operators may be used and still remain within the scope of the present invention. The NOR operator produces a value of 1, when all the values tested by a NOR operation are equal to zero. To construct the virtual lane bit vector, a NOR of each bit is performed, e.g.: 0+0+1+0=0, where the first result of the NOR operation is 0, because one of the values is equal to 1. Next, a NOR operation is performed on the three most significant. In our example, this would result in the equation 0+0+1=0, where the second result of the NOR operation is 0. Next, a NOR operation is performed on the two most significant bits. In the example this would result in the equation 0+0=1, where the third result of the NOR operation is 1. lastly, A NOR operation is performed on the last bit. In the example this would result in the following representation NOR (0)=1.

The bits resulting from this process would be organized with the fourth result placed in the most significant position and the first result placed in the least significant position. The combined result would then be 1100. In the present embodiment, a 6-bit virtual lane bit-vector is built, by placing a 1 in the least significant position and a 0 in the most significant position. The result of this operation is shown is the virtual lane bit vector, in Table XII, given below.

TABLE XII

Virtual Lane bit vector

| Bit position: | 5 4 3 2 1 0 |
|---|---|
| VL bit vector: | 1 1 1 0 0 0 |

The port is then used to determine which virtual lanes the port is capable of supporting. A virtual bit lane bit position value is accessed from the port and used to index into the virtual lane bit vector. Table XIII is an example of the virtual lane bit position values, for specific virtual lanes supported by a port.

TABLE XIII

Virtual Lane Port table

| Value | Virtual Lane Supported |
|---|---|
| 0 | Reserved |
| 1 | VL0 |
| 2 | VL0–VL1 |
| 3 | VL0–VL3 |
| 4 | VL0–VL7 |
| 5 | VL0–VL15 |

Applying this to our example, if this output port could only support VL0 (e.g. virtual lane zero), according to Table XIII, bit position one in the virtual lane bit vector is used. Returning to Table XII to index into the virtual lane bit vector, the virtual lane bit position one is 0. If virtual lane bit position one is 0, this packet is illegal for ports that only support packets communicated on virtual lane 0. The same applies for the other virtual lane bit positions, for example in Table XIII, if the output port only supports VL0–3, bit vector position 3 would be used. A zero in bit position 3 would show that the packet is illegal (e.g. unsupported) for a port which only supports traffic on virtual lanes 0 through 3. A 1 in bit position value 3 would show that the packet is legal for this port; (e.g. its VL must be in the range 0–3).

The characteristics of a virtual lane bit vector resulting from a specific packet are the following: Bit 0 is always zero. Bit 1 is set when the packet virtual lane field identifies VL=0 for use. In the method of the present invention, Bit 1 is set by checking that all bits are equal to zero. This is accomplished by performing a NOR operation between each of the four bits. Bit 2 is set when the packet virtual lane field identifies VL=0 or 1, for use. In the method of the present invention, Bit 2 is set by checking that all but the least significant bit is equal to zero. This is accomplished by performing a NOR operation between each of the three bits.

Bit 3 is set when the packet virtual lane field identifies VL=0 to 3 for use. In the method of the present invention, Bit 3 is set by checking that the next two bits are equal to zero. This is accomplished by performing a NOR operation between the two bits. Bit 4 is set when the packet virtual lane field identifies VL=0 to 7 for use. In the method of the present invention, Bit 4 is set by checking that final bit is equal to zero. This is accomplished by performing a NOR operation on the final bit. Bit 5 is set when the packet virtual lane field identifies VL=0 to 15 for use. In the method of the present invention, Bit 5 is always set to 1 since any VL will satisfy a valid VL of 0–15.

Figure 4:
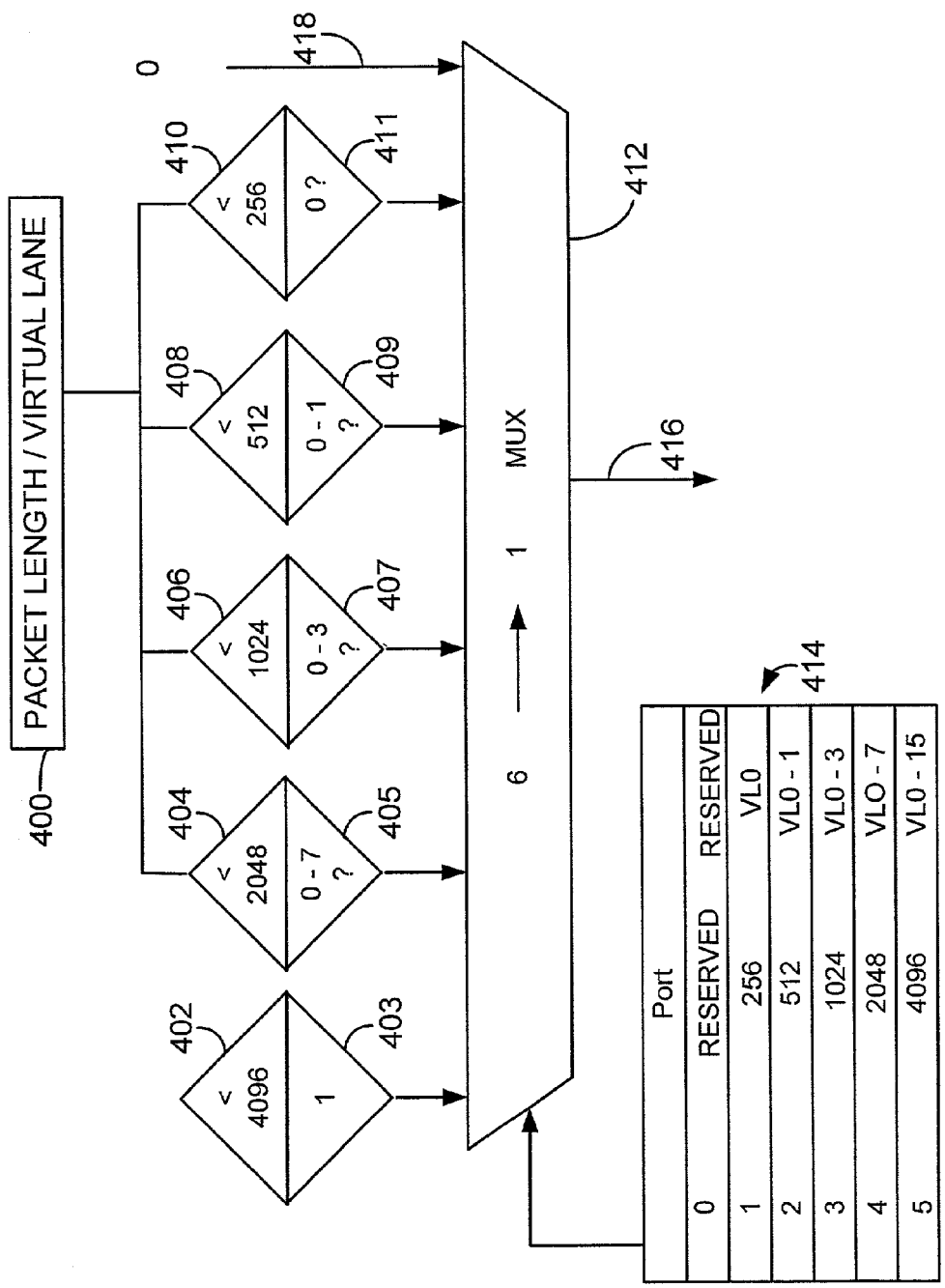
FIG. 4 is an implementation diagram of the present invention.

A high level implementation of the present invention is shown in FIG. 4. In FIG. 4 a packet comes into a switch. The packet includes a field representing a packet length and a field representing the virtual lane as shown by 400. Although the packet length bit-vector and the virtual lane bit vector are described together, they are two separate bit vectors and are constructed separately. If the packet length is less than 4096, the least significant bit of the packet length bit vector is set as shown by 402. In constructing the virtual lane bit vector the least significant bit is always set to one as shown by 403. If the packet length is less than 2048 and the virtual lane is between 0 and 7 the next bit in the packet length bit vector is set as shown by 404 and the next bit in the virtual lane bit vector is set as shown by 405. If the packet length is less than 1024 and the virtual lane identified by the packet is between 0 and 3, the third bit in the packet length bit vector and the third bit the virtual lane bit vector are each individually set as shown by 406 and 407, respectively. If the packet length is less than 512 and the virtual lane is between 0 and 1, the second bit in the packet length bit vector and the second bit the virtual lane bit vector are each individually set as shown by 408 and 409. If the packet length is less than 256 and the virtual lane is zero, the first bit in the packet length bit vector and the first bit the virtual lane bit vector are each individually set as shown by 410 and 411 respectively. The LSB in both the packet length bit vector and the virtual lane bit vector, is always set to zero in the current implementation as shown by 418.

The packet length or virtual lane bit vector is stored in a 6 to 1 multiplexer as shown by 412. A table 414 includes the packet length maximums and the virtual lanes enabled on a specific port. For example, if a port is capable of supporting packet lengths of 1024 or virtual lanes between 0 and 3, a bit value of 3 will be used to index into the bit vector stored in the multiplexer 412. The bit value of 3 will index into the 6 to 1 multiplexer and test the value in position three of the bit vector. If the bit value of position three in the bit vector is 1, the output signal 416 will be a pass signal. If the bit value of position three in the bit vector is 0, the output signal 416 is a fail signal. The pass signal signifies that the port can support a packet with a length of 1024 or a packet that is communicated on virtual lanes 0 through 3. A fail signal will reflect the fact that the port cannot support the packet size or the virtual lane designated by the packet.

Figure 5:
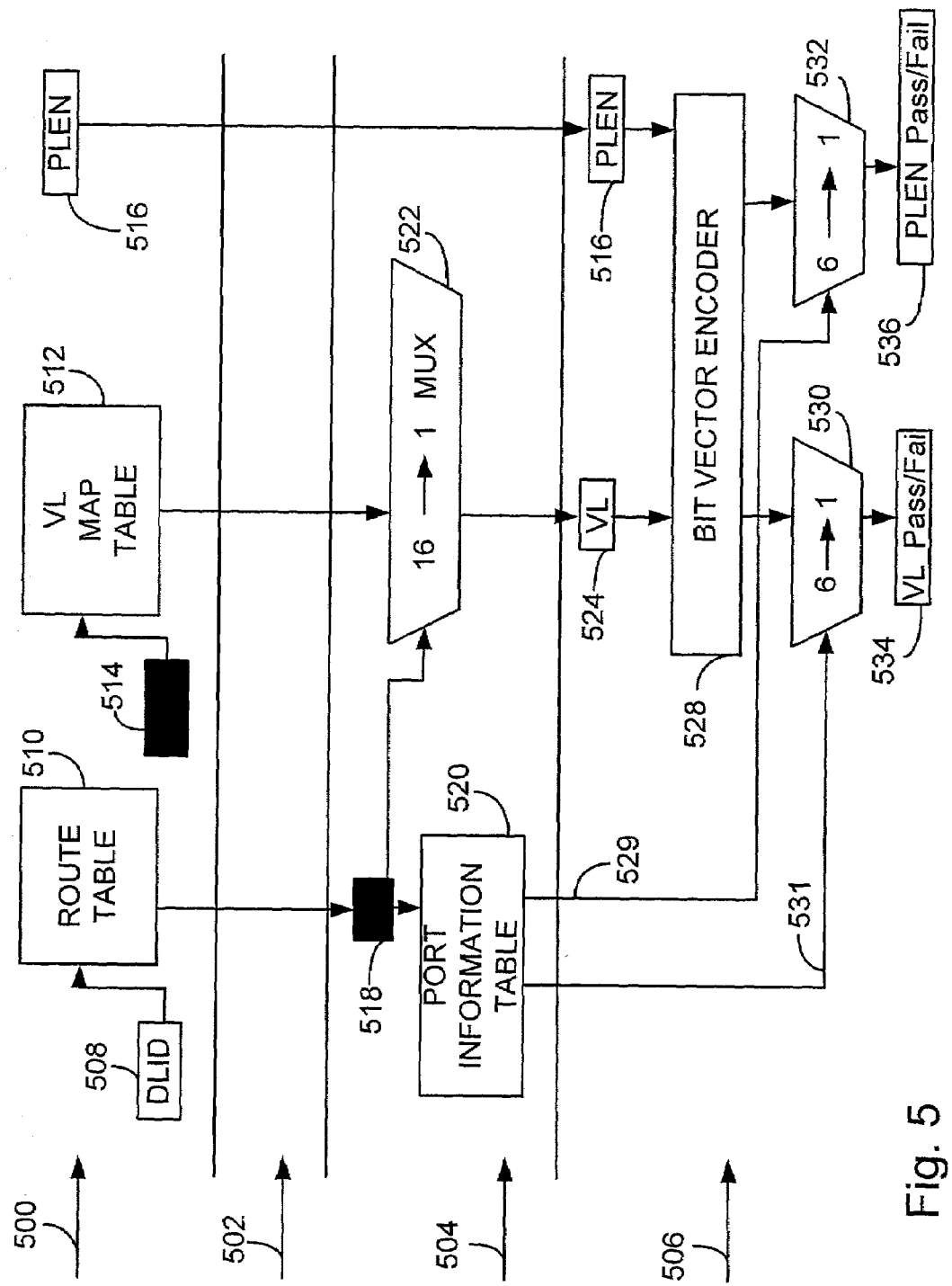
FIG. 5 is a timing implementation diagram of the present invention.

FIG. 5 displays a detailed timing implementation of the method and apparatus of the present invention. In FIG. 5 a first period 500, a second period 502, a third period 504 and a fourth period 506 are shown. In the present embodiment, the first period 500, the second period 502, the third period 504 and the fourth period 506 combine for a total of 16 nanoseconds (e.g. 4*4 nanosecond periods). In the first period 500 a DLID 508, an SL/IP 514 are read in from the packet and are available for use. In addition, the packet length 516 is available during the first period. Since the DLID, SL, IP and PLEN are available in the first period from the incoming packet, construction of the packet length bit vector and the virtual lane bit vector can begin.

The DLID is used to index into a route table 510 to determine an output port (OP) 518 in the third period 504. The SL and IP are used as an index into a virtual lane map table 512, to select a virtual lane. In the present embodiment, sixteen ports are supported by a sixteen to one multiplexer 522. In the third period 504, the output port 518 is used as an index into the sixteen to one mulitiplexer 522 to generate a virtual lane 524.

The virtual lane 524 and the packet length 516 are available in the fourth period 506. The virtual lane 524 and the packet length 516 are used to construct a bit vector, by a bit vector encoder 528. Once the bit vectors have been constructed, using the methodology presented above, the bit vectors are loaded into a six to one multiplexer.

The port information table 520 stores information on the ports. For example, the port information table includes, maximum MTU size for the port and acceptable virtual lanes for the port. A packet length index signal is shown as 529 and a virtual lane index signal is shown as 531. The packet length index signal 529 indexes into a packet length multiplexer 532. The packet length multiplexer 532 stores a packet length bit vector constructed by the bit vector encoder 528. A pass or fail signal 536 results from indexing a packet length bit vector stored in the packet length multiplexer 532, with the packet length index signal 529. The pass/fail signal 536 designates whether the packet length is supported by the port. The virtual lane index signal 531 indexes into the virtual lane multiplexer 530. A pass or fail signal 534 results from indexing a virtual lane bit vector stored in the virtual lane multiplexer 530, with the virtual lane index signal 531. The virtual lane pass/fail signal 534 designates whether the virtual lane is supported by the port.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for determining whether a port can support a packet, comprising:
   an encoder constructing a bit vector in response to packet information, the bit vector including bit positions representing a range of testable packet information values;
   a memory storing port information representing allowable packet information values for packets on the port; and
   indexing logic coupled to the encoder and coupled to the memory, the indexing logic generating an output signal by using the port information to index into a bit position in the bit vector so as to test whether the packet information is within bounds of the allowable packet information values, the output signal thereby indicating whether the port can support the packet.

2. A switch comprising the system as set forth in claim 1.

3. A router comprising the system as set forth in claim 1.

4. An interface card comprising the system as set forth in claim 1.

5. A system as set forth in claim 1, wherein the encoder is a packet length encoder and the bit vector is a packet length bit vector.

6. A system as set forth in claim 1, wherein the encoder is a virtual lane encoder and the bit vector is a virtual lane bit vector.

7. A system as set forth in claim 1, wherein the output signal is a pass signal.

8. A system as set forth in claim 1, wherein the output signal is a fail signal.

9. A system as set forth in claim 1, wherein the indexing logic is implemented with a multiplexer.

10. A system for determining whether a port can support a packet, comprising:
   means for constructing a bit vector in response to packet information, the bit vector including bit positions presenting a range of testable packet information values;
   means for storing port information representing allowable packet information values for packets on the port; and
   means for generating an output signal by using the port information to index into a bit position in the bit vector so as to test whether the packet information is within bounds of the allowable packet information values, the output signal thereby indicating whether the port can support the packet, wherein said means for generating an output signal is coupled to said means for constructing a bit vector and said means for storing port information.

11. A method of operating a system for determining whether a port can support a packet, comprising the steps of:
   constructing a bit vector in response to packet information, the bit vector including bit positions representing a range of testable packet information values;
   storing port information representing allowable packet information values for packets on the port; and
   generating an output signal by using the port information to index into a bit position in the bit vector so as to test whether the packet information is within bounds of the allowable packet information values, the output signal providing at least some indication of whether or not the packet passes or fails.

* * * * *